Patented Dec. 8, 1931

1,835,704

UNITED STATES PATENT OFFICE

FRIEDRICH FROWEIN AND ERICH RAHLFS, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF POTASSIUM NITRATE

No Drawing. Application filed August 19, 1929, Serial No. 387,079, and in Germany September 14, 1928.

The present invention relates to the production of potassium nitrate.

It is already known that potassium nitrate may be produced by the conversion of calcium nitrate with potassium chloride. The conversion can be carried out in the cold as well as in the hot. In both cases, however, after separation of the potassium nitrate solutions of calcium chloride containing nitrate are obtained, the working up of which is both difficult and uneconomical.

We have now found that the yield of potassium nitrate can be considerably increased and in some cases can even be rendered quantitative, by carrying out the separation of the potassium nitrate in the presence of ammonia. For this purpose the ammonia can be added either before the conversion, for example by starting from an ammoniacal solution of one or of both the substances to be converted, or the ammonia can be added after mixing the components or after the conversion, for example, by passing gaseous ammonia into the reaction liquid. A saturation of the reaction liquid with ammonia is in many cases not necessary, for example, when converting equivalent quantities of calcium nitrate and potassium chloride at sufficiently low temperatures, for example 0° centigrade, a maximum yield of potassium nitrate is obtained if from 20 to 25 parts of ammonia are employed for each 100 parts of water present.

The ammonia can be recovered from the residual ammoniacal solution in the usual manner after the separation of the potassium nitrate.

The aforesaid process can be still further improved by cooling the mother liquor from the precipitated potassium nitrate to very low temperatures for example those between 0° and 30° below zero centigrade, and then treating it with gaseous ammonia or gases containing ammonia, for example, the gas mixtures obtained in the synthesis of ammonia. Thereby, the calcium chloride is precipitated in the form of the double compound with ammonia $CaCl_2.6NH_3$. The precipitate may be filtered off from the mother liquor containing nitrate, if necessary, with the employment of suction or pressure, and the said liquor which is now freed from the greater part of the calcium chloride may either be led back to the first stage of the process, namely for the conversion of fresh amounts of calcium nitrate and potassium chloride, or may be directly worked up into potassium nitrate, for example, by concentration and crystallization. By heating the double compound of calcium chloride and ammonia, calcium chloride and pure ammonia are obtained. When employing this method of working it is not necessary to provide for the potassium nitrate being precipitated as quantitatively as possible in the conversion, since it is easy to convert the liquor containing the remainder of the salt by the removal of the calcium chloride into a liquor which can be readily worked up or which is valuable for a repeated operation. In the case described, for example, a yield of about 95 per cent of precipitated potassium nitrate is quite sufficient, and this can be obtained without difficulty. It is necessary for the formation of the $CaCl_2.6NH_3$ that the partial pressure of the ammonia should be at least 2 atmospheres.

The ammonia recovered from the double compound of calcium chloride and ammonia may be employed for the working up of fresh amounts of waste liquor, if desired.

This manner of working involves the additional advantage that the recovery of pure ammonia in a simple manner from gas mixtures containing ammonia, in particular from synthesis gases, is possible.

The following examples will further illustrate the nature of this invention, but the invention is not restricted to these examples. The parts are by weight.

Example 1

64 kilograms of potassium chloride are introduced at 60° centigrade into 100 litres of a solution containing 48 per cent by weight of calcium nitrate. After cooling to 0° centigrade, whereby a part of the potassium nitrate separates out, gaseous ammonia is passed in in such quantity that each 10 parts of the water present contain about 5 parts of ammonia, whereby further quantities of potassium nitrate separate out.

Altogether 85.5 kilograms of potassium nitrate with a chlorine content of 3.3 per cent are obtained. This corresponds to a yield of 96 per cent calculated with reference to nitrogen and of 99.5 per cent calculated with reference to potassium.

Example 2

150 parts of potassium chloride are introduced into 342 parts of calcium nitrate solution of 48 per cent strength. After cooling to 0° C., whereby part of the potassium nitrate is precipitated, gaseous ammonia is passed into the liquid until it contains about 5 parts of ammonia for each 10 parts of water. The precipitated potassium nitrate (191.9 parts) is filtered off, the remaining solution is saturated with ammonia at 0° C. and under a pressure of 5 atmospheres. 202.6 parts of calcium chloride ammonia double compound $CaCl_2.6NH_3$ are precipitated and filtered off. The remaining solution is used for conversion of further amounts of calcium nitrate and potassium chloride.

What we claim is:—

1. The process of producing potassium nitrate, which comprises converting calcium nitrate with potassium chloride and separating the potassium nitrate in the presence of ammonia.

2. The process of producing potassium nitrate, which comprises converting calcium nitrate with potassium chloride and simultaneously separating the potassium nitrate in the presence of ammonia.

3. The process of producing potassium nitrate, which comprises converting calcium nitrate with potassium chloride, separating the potassium nitrate in the presence of ammonia, and treating the mother liquor with ammonia at a temperature below 0° centigrade, thereby separating calcium chloride in the form of its double compound with ammonia.

In testimony whereof we have hereunto set our hands.

FRIEDRICH FROWEIN.
ERICH RAHLFS.